Patented Oct. 27, 1936

2,058,477

UNITED STATES PATENT OFFICE 2,058,477

DIBENZANTHRONES

William Hiram Lycan, South Milwaukee, Wis., assignor to E. I. du Pont de Nemours & Company, Wilmington, Del., a corporation of Delaware No Drawing. Application October 11, 1933, Serial No. 693,147

5 Claims. (Cl. 260—61)

This invention relates to carbon compounds and more particularly to derivatives of dibenzanthrones. Specifically, it deals with condensation products of certain members of the dibenzanthrone series of compounds (which term is meant to comprise violanthrones, isoviolanthrones and the like) with various other carbon compounds in the presence of aluminum chloride.

Dibenzanthrones are powerful vat dyes. Since their discovery a tremendous amount of research work has been expended upon them. This work has developed the fact that two positions of a dibenzanthrone nucleus are more reactive than the others. A great many dibenzanthrone compounds having substituents in these two positions have been produced and are mentioned in the literature. It is the general belief that the Bz-2, Bz-2' positions are the ones showing this particular activity.

According to this invention it has been found that very valuable compounds may be produced by condensing dibenzanthrone bodies, which have the Bz-2, Bz-2' positions occupied, with such compounds as carbonyl halides, sulfonyl halides, aldehydes, omega-di-halogen-methyl compounds and acid anhydrides in the presence of aluminum chloride.

This invention has for an object the preparation of new chemical compounds. The devising of new chemical processes and the preparation of carbon compounds in very desirable physical form and in a high state of purity are also objects of the invention. A general advance in the art and other objects which will appear hereinafter are also contemplated.

The invention will be further understood from a consideration of the following detailed description and specific examples in which the parts are given by weight.

Example I

Two hundred fifty (250) parts of anhydrous antimony tri-chloride were melted and heated under agitation to 180° C. whereupon 125 parts of aluminum chloride were added. This addition caused the temperature to fall to about 100–110° C. Heat was applied and the resulting melt agitated until homogeneous at 150° C. It was then cooled to about 100° C. and 40 parts of dichloro-violanthrone (obtained by chlorinating violanthrone in nitrobenzene to such a chlorine content) was added at such a rate as to hold the temperature around 110° C. The melt was then agitated at the same temperature for a short time to insure homogeneous mixing after which 24 parts of 1-chloro-anthraquinone-2-carbonyl chloride were added at 105–110° C.

The resulting melt was heated under agitation to 140–150° C. within which limits it was held during the course of 1–6 hours. When condensation was complete the melt was allowed to cool to about 120° C. whereupon it was poured into a large quantity of dilute hydrochloric acid solution (5–10% HCl). The resulting suspension was agitated and heated for a short time at 90°–100° C. and filtered. The heavy metal salts were removed by washing the cake repeatedly with hot dilute hydrochloric acid solution. After removing the excess acid by washing with hot water the cake was washed with hot dilute ammonia solution to insure the removal of any remaining organic acid. The cake was then washed neutral with hot water and a portion of it dried. The remaining portion was made into the dye paste directly with the addition of a dispersing agent. The dried product was a reddish blue powder soluble in concentrated sulfuric acid with a red violet coloration. It was readily soluble in alkaline hydrosulfite solution yielding a blue vat from which cotton was dyed in green shades of navy blue. Analysis of the product indicated that chlorine had neither been lost nor added during the course of the reaction. The product was found to be useful as an intermediate and also as a dyestuff, both in printing and dyeing. The dyeings exhibit good fastness to spotting with water and have otherwise excellent general fastness.

Example II

In the manner described in Example I, a melt was prepared from 300 parts of antimony trichloride and 150 parts of aluminum chloride. The temperature was agitated to 95–100° C. and an atmosphere of oxygen maintained above its surface. Under these conditions 50 parts of di-oxy-violanthrone (prepared by treating a sulfuric acid solution of di-hydroxy-dibenzanthrone with sodium nitrite) was added at such a rate that the temperature did not materially vary from the range above set out. Thereafter 30 parts of 1-chloro-anthraquinone-2-carbonyl-chloride was added slowly while maintaining the same temperature. The resulting melt was heated gradually to 140–150° C. and was held there for one hour. After this time the reaction was complete and the product was isolated in a pure form in the hereinbefore described manner. The product was a greenish black powder yielding green dyeings. The product, when methylated in the manner well known to those skilled in the art, gave a dyestuff yielding blue-green dyeings of excellent fastness properties.

Example III

In the manner previously described a condensation was brought about between 100 parts of di-hydroxy-isoviolanthrone and 60 parts of anthraquinone-2-carbonyl chloride in a melt consisting of 600 parts of antimony tri-chloride and 300 parts of aluminum chloride. The condensation was completed and a reaction product isolated in the manner previously described. There was thus obtained a product yielding green solutions in sulfuric acid and a blue alkaline hydrosulfite vat. Cotton was dyed in dull blue shades from the vat. Upon methylation under well known conditions this product yields a dyestuff giving pure blue shades on cotton.

Example IV

In a melt comprising 300 parts of antimony trichloride and 150 parts of aluminum chloride, 50 parts of dimethoxy-violanthrone were condensed with 30 parts of 1-chloro-anthraquinone-2-carbonyl chloride. The reaction was carried out and the product isolated in the manner previously described. Apparently demethylation occurred during the condensation. Upon methylation of the final product a substance, similar to that produced in Example II, was obtained.

Example V

A melt consisting of 150 parts of antimony trichloride and 75 parts of aluminum chloride was prepared in the manner previously described. After adjusting the temperature of the melt to 95–100° C. 20 parts of di-nitro-violanthrone was added at such a rate as to maintain the temperature within the limit specified. When this addition was complete there was added under similar conditions, 12 parts of 1-chloro-anthraquinone-2-carbonyl-chloride. The melt was then gradually heated to 150° C. and held thereabout for one hour. It was then cooled a little and finally diluted with a 10% hydrochloric acid solution. The product was isolated in the manner described in the preceding examples. It consisted of a gray-black powder which yielded violet solutions in sulfuric acid. The product, when used for dyeing, gave a blue shade from which cotton was dyed in gray shades. The product is also a desirable dyestuff intermediate.

Example VI

A condensation between 40 parts of di-hydroxy-violanthrone and 25 parts of 1-chloro-anthraquinone-2-carbonyl-chloride was brought about in a melt consisting of 300 parts of antimony trichloride and 150 parts of aluminum chloride. The reaction was accomplished in the absence of oxygen but otherwise in the manner described in Example II. The product was isolated according to the processes previously described. It was similar in all respects to the products of Example II and was found to yield a similar blue-green dyestuff upon methylation in the manner previously set out.

Example VII

In a melt consisting of 300 parts of antimony trichloride and 150 parts of aluminum trichloride, 50 parts of trichloro-isoviolanthrone were condensed with 35 parts of 1-chloro-anthraquinone-2-carbonyl-chloride in the manner previously mentioned. Reaction was carried out and the product isolated exactly as described in the preceding examples. There was obtained a dark blue powder yielding green solutions in sulfuric acid. From blue alkaline hydrosulfite vats of the product, cotton was dyed in blue shades of violet.

Example VIII

A melt consisting of 300 parts of anhydrous antimony trichloride and 150 parts of aluminum chloride was prepared exactly as described in Example I. To this melt, while maintained at 100–110° C., there was added 40 parts of a di-chloro-violanthrone (obtained by the chlorination of violanthrone with sulfuryl chloride in nitrobenzene). The addition was made at such a rate as to maintain the temperature previously mentioned. When the melt had again become homogeneous there was added 27 parts of 1-chloro-anthraquinone-2-carbonyl-chloride at the same temperature. Thereafter the melt was heated to 140–150° C. where it was held under good agitation for 1–6 hours. The new product which was isolated in the manner described in Example I, resembled the same closely in general properties. Cotton dyeings, however, gave navy blue shades, somewhat greener than those obtained from the product of Example I. It had good fastness to spotting with water and other general fastness properties were excellent.

Example IX

In the manner described in Example I, 40 parts of a tri-chloro-violanthrone (obtained by chlorinating violanthrone in ortho-di-chloro-benzene, with chlorine gas), were condensed with 27 parts of 1-chloro-anthraquinone-2-carbonyl-chloride in a melt consisting of 250 parts of anhydrous antimony trichloride and 125 parts of aluminum chloride. The condensation was carried out and the product isolated in the manner previously described. The new product has properties similar to those described for the product of Example I, with the exception that dyeing cotton in slightly greener shades of navy blue, the dyeings have good fastness to spotting with water and for this reason merit special mention.

Example X

To a melt consisting of 250 parts of anhydrous antimony trichloride and 125 parts of aluminum chloride, prepared as described in Example I, there was added 30 parts of dichloro-violanthrone prepared by chlorinating violanthrone in ortho-di-chloro-benzene while maintaining a temperature of 100–110° C. When the reaction had become homogeneous 14 parts of para-nitrobenzoyl chloride were added in portions. There was a considerable evolution of heat and the rate of addition was necessarily slow in order that the above set out temperature range might be maintained. After all the material was added, the temperature was then raised to 140–150° C. and the reaction melt agitated at this temperature for 1–6 hours. The condensation product was isolated by cooling to 110–120° C. and following the methods described in the preceding example. The resultant product was thus obtained as a reddish-blue powder which yielded violet solutions in sulfuric acid. It was readily soluble in alkaline hydrosulfite solutions to a blue vat from which cotton was dyed in reddish shades of navy blue. The dyeings exhibited considerably more fastness to spotting with water than those of the starting intermediate and had otherwise excellent general fastness properties.

*Example XI*

Forty (40) parts of tetrachloro-violanthrone (prepared by chlorination of violanthrone with chlorine in ortho-chloro-benzene) and 26 parts of 1-chloro-anthraquinone-2-carbonyl-chloride were condensed in a melt consisting of 250 parts of antimony trichloride and 125 parts of aluminum trichloride in the manner previously set out.

The condensation product when isolated and freed from inorganic salts, was obtained as a blue powder which yielded violet colorations in sulfuric acid. It was a vat dye soluble in alkaline hydrosulfite to form a bright green blue vat from which cotton was dyed in green shades of navy blue. The dyeings possessed excellent general fastness properties.

*Example XII*

By methods similar to those described in the preceding example there was prepared a melt of 300 parts of antimony trichloride and 150 parts of aluminum chloride. To this melt, held at 95–100° C., there was added 50 parts of dichloro-isoviolanthrone followed by 20 parts of benzaldehyde. The temperature was gradually raised to 140° C. and held at about that point for one hour, while maintaining good agitation in the melt. In the manner described in the foregoing examples the melt was cooled and the condensation product isolated. It was a reddish-black powder yielding blue-green solution in sulfuric acid. As a vat dyestuff it was soluble in alkaline hydrosulfite solutions giving greenish-blue colored vats from which cotton was dyed in fast violet shades.

*Example XIII*

Condensation was brought about between 50 parts of pentachloro-violanthrone and 20 parts of acetic anhydride in a melt consisting of 250 parts of antimony trichloride and 125 parts of aluminum chloride. The manner in which the reaction was accomplished and the product isolated corresponded to that set out in preceding examples. The product was a dark blue powder yielding violet sulfuric acid solutions and blue-green alkaline hydrosulfite vat. From the vat, cotton was dyed in navy blue shades.

*Example XIV*

A condensation was brought about between 20 parts of di-nitro-violanthrone and 10 parts of phthalic anhydride in a melt consisting of 150 parts of antimony trichloride and 75 parts of aluminum chloride in the manner set out in Example V. The product was isolated in the manner set out in foregoing examples and was a black powder giving violet colored sulfuric acid solutions. The yield was substantially quantitative, the product was a vat dye, dyeing cotton greenish-blue shades from a blue alkaline hydrosulfite vat. The product is a valuable dyestuff intermediate.

*Example XV*

A melt consisting of 250 parts of anhydrous antimony trichloride and 125 parts of aluminum chloride was prepared according to the method set out in Example I and while maintained at 100–110° C. there was added 30 parts of dichloro-violanthrone (obtained by chlorinating violanthrone in ortho-dichloro-benzene). At the same temperature there was then added 14 parts of phthalic anhydride. When these additions were complete the reaction mixture was heated to 150–160° C. and held thereabout for 1–6 hours. Upon cooling the melt to 110–120° C., drowning in dilute hydrochloric acid solutions and isolating the product in the manner previously described there was obtained a reddish-bue powder which was a vat dye. It dissolved in sulfuric acid with violet coloration and in alkaline hydrosulfite solutions to give blue shades. From these vats cotton was dyed in green shades of navy blue which showed good fastness to spotting with water. Other general fastness properties were all excellent.

*Example XVI*

In a melt consisting of 150 parts of antimony tri-chloride and 75 parts of aluminum chloride, 20 parts of di-nitro-violanthrone was allowed to react with 11 parts of para-nitrobenzoyl chloride, exactly as described in Example V. The product which was a black powder was isolated in the usual manner, gave violet coloration in sulfuric acid and blue vats with alkaline hydrosulfite. From these vats cotton was dyed in bluish-green shades. The product is a valuable intermediate.

*Example XVII*

A melt consisting of 250 parts of anhydrous antimony tri-chloride and 120 parts of aluminum chloride was prepared as described in Example I. The temperature was held at 100–110° C. and there was added to the melt 40 parts of di-chloro-isoviolanthrone obtained by chlorinating isoviolanthrone in ortho-di-chloro-benzene. When the melt was again homogeneous there was added 24 parts of 1-chloro-anthraquinone-2-carbonyl-chloride at the same temperature. The reaction melt was then gradually heated to 140–150° C. and agitated thereabouts for 1–6 hours. After cooling the melt to 110–120° C. the product was isolated as described in Example I. The reddish-blue powder, which was obtained, yielded pure green solutions in sulfuric acid. The product, which is a vat dyestuff, was readily soluble in alkaline hydrosulfite solutions, forming a blue vat from which cotton was dyed in blue-violet shades. The dyeings exhibited much greater fastness to spotting with water than did those of the starting material. The other fastness properties of the new dye were generally excellent.

*Example XVIII*

A melt consisting of 250 parts of anhydrous antimony trichloride and 125 parts of aluminum chloride, was prepared as described in Example I and to this melt by the methods previously described 30 parts of di-chloro-violanthrone (obtained by chlorinating violanthrone in ortho-dichloro-benzene) and 14 parts of benzene-sulfonyl-chloride were condensed. The di-chloro-violanthrone and the benzene-sulfonyl-chloride were aded to the melt at 110–120° C. Since considerable heat was involved the addition of the sulfonyl-chloride was necessarily slow. After the intermediates had been added to the melt, the temperature was raised to 140–150° C. and maintained thereabouts while reaction mixture was agitated for 1–6 hours. At the end of this time the melt was allowed to cool to 110–120° C. and the product isolated as described in Example I. The reddish-blue powder obtained, dissolved in sulfuric acid to give blue to reddish-blue solutions. It was difficultly soluble in alkaline hydrosulfite vat from which cotton was dyed in blue to bluish-gray shades.

The catholicity of the invention is apparent from the preceding description and the specific examples. As there shown it is applicable to dibenzanthrones having the Bz-2, Bz-2' positions occupied in general.

As has been shown, carbonyl halides (for example, chlorides and bromides) are especially suitable for the reactions utilized in this invention. Sulfonyl halides (for example, the chloride and the bromide) and carboxylic acid anhydrides, produce very desirable results. The alkal halides (that is, omega-di-halogen-methyl compounds, the generic term for such compounds as the alkyl-idine di-halides, aralkyl-idine dihalides, aldehyde dihalides, benzal-chloride homologs and analogs, omega-dihalogen methyl-anthraquinone, and the like) (especially the di-chlorides and the di-bromides) and the aldehydes, as previously indicated, gave excellent results.

For the condensation with the dibenzanthrone bodies, acyclic, carbocyclic and heterocyclic compounds may be utilized. The aromatic compounds of the benzene, naphthalene, anthracene, pyrene, perylene, phenanthrene and anthraquinone series, are deserving of special mention. The condensed ring compounds of the naphthalene and anthraquinone series are especially desirable. The benzoic anhydrides and naphthoic acid chlorides are quite advantageously used.

The amount of the antimony trichloride or other metal halides in the aluminum chloride melt may be varied over a wide range. If desired the antimony trichloride may be omitted entirely. The addition of other metal chlorides, such as sodium chloride and zinc chloride, to the melt for the purpose of producing proper fluidity, melting point or other physical and chemical conditions, may be made if found expedient.

The temperature limits set forth in the foregoing examples are capable of wide variation without harmful change in the results. Ordinarily the temperature range of 90–180° C. for the condensation is preferred. Temperatures outside this range may be used at the sacrifice of time and/or yield of product. The temperatures for producing homogeneity in the melt and for drowning the fusion are not especially significant and depend upon the convenience of the person carrying out the reaction.

Time limits are likewise elastic and no detriment to the product has been noted after prolonged heating in the reaction melt.

The proportions of the reactants may be widely varied without apparently affecting the results. An excess of either reactant remains in the melt when the reaction is complete. The reactant present in the least molecular proportion is quantitatively consumed during the reaction. Any excess dibenzanthrone may be separated from the condensation product by virtue of their diverse solubilities in such solvents as concentrated sulfuric acid, organic solvents and alkaline hydrosulfite solutions. Any excess of the other reactants may be removed by suitable expedients, for example, extraction with organic solvents or aqueous alkaline solutions.

The exact change taking place in the dibenzanthrone molecule, during the condensation, is not known. It is believed that a product in which the dibenzanthrone nucleus is linked to the body to which it is condensed is produced.

As many apparently widely different embodiments of this invention may be made without departing from the spirit and scope thereof, it is to be understood that I do not limit myself to the specific embodiments thereof except as defined by the appended claims.

I claim:
1. The process which comprises condensing a member of the group consisting of carbonyl halides, sulfonyl halides, omega-dihalogen-methyl compounds, aldehydes and acid anhydrides with a dibenzanthrone having the Bz-2, Bz-2' positions occupied.

2. The process of claim 1 when the condensation is carried out in the presence of a mixture of aluminum chloride and antimony chloride.

3. The products obtainable according to the process of claim 1.

4. The product obtainable by adding 125 parts of aluminum chloride to 250 parts of anhydrous antimony trichloride at 180° C., raising the temperature of the resultant melt to 150° C., cooling the same to 100° C. and adding 40 parts of di-chloro-violanthrone at such a rate as to maintain a temperature of about 110° C., agitating to secure a homogeneous mixture, adding 24 parts of 1-chloro-anthraquinone-2-carbonyl chloride while maintaining a temperature of 105–110° C., agitating while heating to 140–150° C. for 1 to 6 hours, cooling to 120° C., pouring into dilute hydrochloric acid solution, agitating while heating at 90°–100° C. and filtering.

5. The process which comprises mixing aluminum chloride and antimony tri-chloride, heating the resultant mixture until it is liquid, incorporating di-chloro-violanthrone in the melt at such a rate that the melt remains liquid, adding 1-chloro-anthraquinone-2-carbonyl-chloride and heating until the condensation has taken place.

WILLIAM HIRAM LYCAN.